United States Patent Office 3,290,982
Patented Dec. 13, 1966

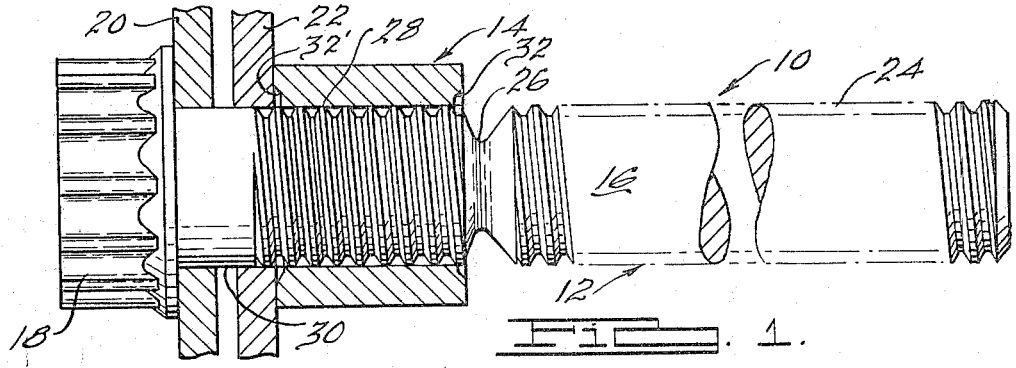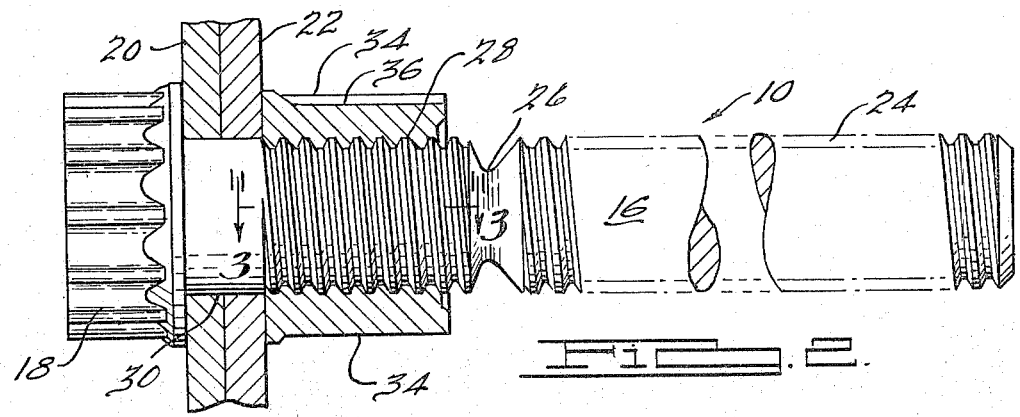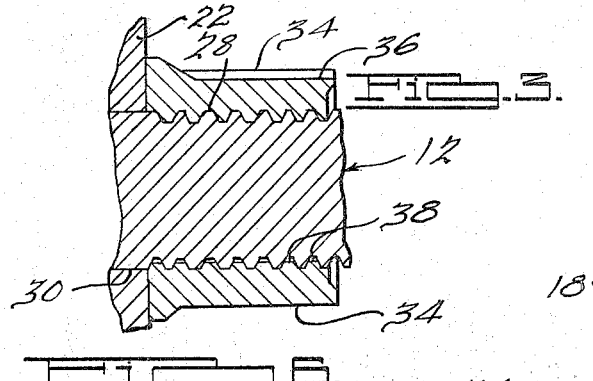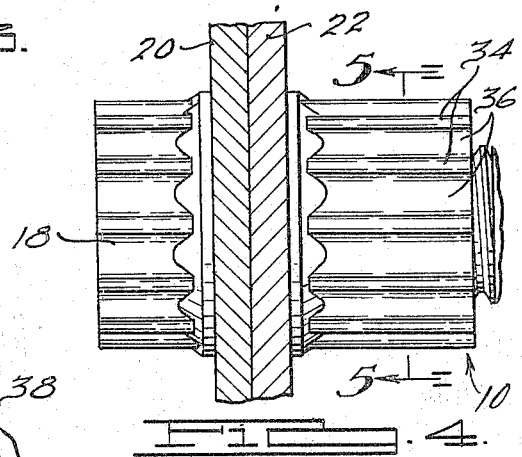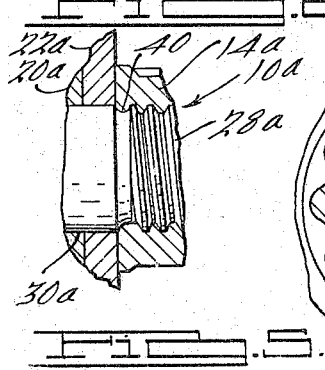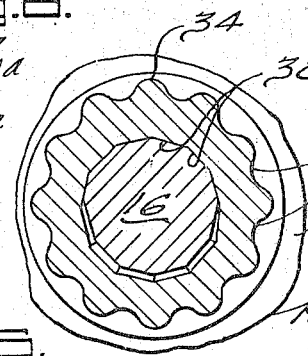
INVENTOR.
Charles F. Marschner.
BY
Harness, Dickey & Pierce
ATTORNEYS.

3,290,982
LOCKBOLT CONSTRUCTION INCLUDING
SWAGED NUT
Charles F. Marschner, Marietta, Ga., assignor to Huck
Manufacturing Company, Detroit, Mich., a corporation
of Michigan
Filed Mar. 20, 1964, Ser. No. 353,511
3 Claims. (Cl. 85—1)

This invention relates to fasteners and more particularly to fastening devices of the type including a pin and a collar in which the collar is swaged onto the pin and also relates to a novel method of setting fastening devices of the latter type and of joining together a plurality of workpieces.

More specifically, the present invention is an improvement upon the lockbolt type fastener such as is shown and described in U.S. patents to L. C. Huck, No. 2,531,048, No. 2,531,049 and No. 2,754,703, and also is an improvement on the method shown therein.

One objective in securing two or more workpieces together by means of fasteners, whether of the lockbolt or nut and bolt type, is to hold the workpieces together with a known, selected tensile preload. With a nut and bolt the only practical way of setting preload is indirectly, by tightening the nut to a selected torque. Because of frictional variations between mating parts consistent preloads are difficult to attain and this method of determining tensile preload has generally been acknowledged in the trade to be quite inaccurate. The lockbolt is set by swaging the collar onto the pin by means of a relative axial force or tensile load and hence provides a direct means for accurately fixing the tensile preload. Thus with the lockbolt, the frictional problems present in assembling the nut and bolt are nonexistent and the lockbolt can be assembled under a controlled preload. Conventionally the lockbolt collar is swaged into annular locking grooves in the pin and can be removed only by a destructive method such as cutting, etc. With the nut and bolt, however, the nut can be removed from the bolt, the workpieces disassembled, and the nut and bolt can be reused upon reassembly of the workpieces. The improved lockbolt of the present invention has the advantages of controlled preload of the lockbolt and of reusability of the nut and bolt.

In current practice the nut is preformed with externally disposed flats or some other configuration facilitating being gripped by a wrench and is prethreaded internally for engagement with the bolt. With the improved lockbolt construction of the present invention a threaded pin and a plain collar are used; threads are formed in the plain collar as the collar is swaged into the threaded pin; at the same time the outer surface of the collar is formed to a configuration facilitating being gripped by a wrench. With the swage formed threads on the collar bearing against the threads on the pin under the selected preload the collar is secured to the pin with a good frictional lock which resists loosening due to vibration, etc. Thus the improved fastener of the present invention in being assembled provides a controlled tensile preload, a good frictional lock, and the swaged collar can be gripped by a wrench and threadably removed from the pin.

Therefore, it is a general object of this invention to provide an improved fastener of the lockbolt type. It is another general object of this invention to provide a fastener having the preload advantages of a lockbolt and the removability and reusability advantages of the nut and bolt. It is a further object of this invention to provide an improved fastener of the lockbolt type which can be assembled with a controlled tensile preload while at the same time forming the fastener such that it can be threadably disassembled and reused. It is still another object of this invention to provide a novel fastener, initially in the form of a threaded pin and a plain collar, which can be assembled with a controlled tensile preload during which the collar is formed internally and externally such that the fastener can be threadably disassembled and reused.

With the concepts generally set forth above, it is apparent that the present invention also includes a novel method of fastening workpieces together. Therefore it is another object of this invention to provide a novel method for fastening workpieces together by a fastener including a pin and a collar, assembled with a controlled preload and in which the collar is formed during assembly both internally and externally such that the fastener can be threadably disassembled and reused.

In a modification of the present invention the improved fastener is provided with a positive locking feature in addition to the frictional locking feature while still retaining the characteristic of removability and reusability. Therefore it is another object of this invention to provide an improved fastener of the lockbolt type which can be assembled with a controlled tensile preload, which can be threadably disassembled and reused and which provides a positive locking feature.

Other objects, features, and advantages of the present invention will become apparent from the subsequent description and the appended claims, taken in conjunction with the accompanying drawings, in which:

FIGURE 1 is a longitudinal, elevational view of an improved fastener, including a pin and a collar, of this invention shown in assembly relation with a pair of workpieces to be connected by the fastener and with some of the parts shown in section;

FIGURE 2 is the same view of the components as shown in FIGURE 1 after the collar has been swaged onto the pin of the fastener;

FIGURE 3 is a sectional view of the fastener of FIGURES 1 and 2 taken substantially along the line 3—3 in FIGURE 2;

FIGURE 4 is a longitudinal, elevational view of the improved fastener of the present invention and shows the fastener of FIGURES 1–3 in its final assembled relationship with the pair of workpieces and with the pintail of the pin of the fastener having been severed at a breakneck groove in the pin;

FIGURE 5 is a sectional view of the fastener of FIGURE 4 taken substantially along the line 5—5 in FIGURE 4; and FIGURE 6 is a fragmentary view depicting a modification of the fastener of FIGURES 1–5 with a positive locking feature.

Looking now to FIGURE 1 of the drawing a fastener, generally indicated by the numeral 10, includes a pin 12 and a tubular collar 14 adapted to be swaged onto the pin 12. The pin 12 has a shank 16 which is shown to extend through aligned openings in a pair of workpieces 20 and 22 and which terminates at one end in an enlarged head 18 which is engageable with the workpiece 20. A pintail portion 24 is located at the end opposite from the head 18 and is threaded to facilitate being gripped by a tool for setting the fastener 10. While the portion 24 is shown to be threaded it should be understood that annular grooves could be provided or that the portion 24 could be formed in any other manner whereby it can be gripped by a tool. The pintail portion 24 is connected to the remainder of the shank 16 by a breakneck groove 26 which is of a reduced cross-section being the weakest section of the shank 16 and serves a purpose to be seen. An intermediate portion 28 is located adjacent the breakneck groove 26 and is threaded over at least a part of its surface with the threads extending up to the breakneck groove 26. The threaded part is of a maximum diameter which is less than the diameter of the aligned apertures in the workpieces 20 and 22. A smooth cylindrical portion 30 can be provided adjacent the head 18 and can be of a diameter slightly greater than that of the apertures to insure that the apertures are completely filled.

The tubular collar 14 has generally smooth internal and external surfaces of generally uniform internal and external diameters from end to end and has a substantially uniform wall thickness. The collar 14 can be of the type disclosed in the co-pending U.S. patent application to H. G. Brilmyer and D. J. Toth, No. 671,285, filed July 11, 1957, now abandoned, and has tapered or chamfered, symmetrical end portions 32, 32'. The end portions 32 and 32' are annular in configuration and of a progressively increasing wall thickness from the ends toward the center. As noted in the above U.S. patent application, that one of the end portions 32, 32' which is engaged by the anvil of the tool holds the anvil from moving over the collar 14 until a selected axial load is attained with the taper being selected such that the internal surface of the collar 14 is not prematurely swaged onto the pin 12 until this selected axial load is reached. This axial load is applied to the workpieces 20, 22 by the tensile force between the head 18 and collar 14 which are engageable with opposite sides of the workpieces 20, 22. Hence, this construction insures that the workpieces 20 and 22 will be secured together under a preselected tensile preload.

In setting the fastener 10, the pin 12 is located with its shank 16 extending through the aligned openings in workpieces 20 and 22 with the head 18 engaging one side of the workpieces 20, 22 and with the collar 18 located over the shank 16 and in engagement with the opposite side of the workpieces 20, 22. The fastener 10, can be set by a tool of the type shown in the U.S. patents to L. C. Huck previously noted. Thus the tool is applied to the fastener 10 and has jaws which grip the pin 12 at the pin tail portion 24 and has a swaging anvil which engages the collar 14. As the tool is actuated a relative axial force is applied between the pin 12 and collar 14 pulling the workpieces 20, 22 tightly together and locating the collar 14 over the threaded part of the intermediate portion 28. The collar 14, as described above, holds the anvil from moving over the collar 14 with the chamfered end portion 32 preventing a premature clinch between collar 14 and pin 12. As the relative axial force reaches a preselected magnitude the anvil moves over the collar 14 swaging or deforming the material of the collar 14 into the threads of the threaded part of the intermediate portion 28 and thereby forming similar complementary female threads on the internal surface of collar 14 (see FIGURE 2). At the same time the external surface of the collar 14 is deformed to form a plurality of circumferentially disposed, axially extending, alternate ridges 34 and grooves 36 which are of a shape to be readily engaged by a wrench. Upon an increase in the relative axial force the pintail portion 24 is severed from the remainder of the shank 16 at the breakneck groove 26 to form the finally set fastener 10 shown in FIGURE 4. Thus with the fastener and method of this invention a plain collar 14 is used and threads are formed on the internal surface while at the same time axially extending gripping grooves 36 and ridges 34 are formed in the external surface. The collar 14 as swaged onto the pin 12 under a preload provides high contact forces between mating surfaces on the pin 12 and against the workpiece 22 and hence requires a high breakaway torque and hence provides a good frictional lock. While the collar 14 is swaged radially inwardly over substantially its entire length and circumference, the radially inward extent of the swage is greater in the areas of the grooves 36 than in the areas of the ridges 34 resulting in a plurality of circumferentially disposed, axially extending, discontinuities 38 on the radially inner surface of the collar 14 (see FIGURES 3 and 5) corresponding to the number of grooves 36, which discontinuities 38 grip the threads of the threaded part of the intermediate portion 28.

Note that the grooves 36 and ridges 34 are formed over substantially the entire length of the collar 14 and are directly, radially over the threads formed in the internal surface of the collar 14; this permits good distribution of the loads encountered as the formed collar 14 is removed with a wrench. The ridges 34 and grooves 36 are spaced closely circumferentially to enhance the deformation of the material of the collar 14 into the pin 12 and also to aid the tool to provide for easier swaging; the ridges 34 and grooves 36, however, are spaced sufficiently to facilitate gripping with a wrench. In the preferred embodiment the external surface of collar 14 is formed with twelve sides, a double hex; however, other configurations could be used and still be within the scope of the present invention. It is also preferred that the head 18 of the pin 12 be formed with axially extending grooves similar to that formed on the collar 14 such that the head 18 can be gripped by the same or similar wrench with which collar 14 is gripped.

With the finally set fastener of FIGURE 4 the collar 14 can be gripped with a wrench and removed and can be reapplied upon reassembly. Thus the novel fastener of the present invention as set by a novel method provides a fastener having the excellent preload characteristics of a lockbolt and has the disassembly and reusability features of a nut and bolt.

A modified fastener 10a has been shown in FIGURE 6 in which components similar to components of fastener 10 of FIGURES 1-5 have been given the same number with the addition of a letter subscript. The modified fastener 10a shown in FIGURE 6 is identical with the fastener 10 of FIGURES 1-5 except than an annular locking groove 40 has been provided in the threads of the intermediate portion 28a. The groove 40 is located at the end of the threads and proximate the forwardmost surface of the workpieces. Material of collar 14a is swaged into groove 40 to provide a positive lock preventing the collar 14a from vibrating or otherwise loosening off the pin 12a; however, the amount of material trapped in the groove 40 is not enough to require the use of any substantial increase in the torque (compared to fastener 10) in the removal of the swaged collar 14a; the reusability feature of fastener 10a is also unimpaired.

While it will be apparent that the preferred embodiment of the invention disclosed is well calculated to fulfill the objects above stated, it will be appreciated that the invention is susceptible to modification, variation and change without departing from the proper scope or fair meaning of the subjoined claims.

What is claimed is:

1. A fastener for securing a plurality of workpieces comprising: a pin and a tubular collar swaged onto said pin, said pin including a shank disposed in aligned openings through the plurality of workpieces and terminating at one end in an enlarged head which engages one side of the workpieces, said shank having a pintail portion at the end opposite from said head and located on the opposite side of the workpieces and adapted to be engaged by a tool for setting said fastener, a breakneck groove connecting said pintail portion to the remainder of said shank and being of a reduced section relative to the other portions of said shank, an intermediate portion located between said head and said breakneck groove and being threaded over at least a part of its surface with the threads extending up to said breakneck groove, said collar being deformed completely circumferentially over substantially its entire length into said threaded part with complementary threads being formed in said internal surface and with a plurality of closely, circumferentially spaced, axially extending ridges and generally V-shaped grooves being formed in said external surface over substantially its entire length, with said ridges and grooves adapted to be gripped by a wrench, a plurality of circumferentially disposed, axially extending discontinuities corresponding to the number of said grooves defined on said internal surface by the material of said internal surface in radial alignment with said grooves extending radially inwardly into the threads of said threaded part to an extent greater than the material of said internal surface in radial alignment with said ridges, said complementary threads gripping said threads of said intermediate portion with the force produced by swaging said collar into said intermediate portion while forming said ridges, grooves and discontinuities, said collar including means at one end for holding off the tool from swaging said collar until a selected tensile load is applied to the workpieces between said collar and said head, said pintail being severable from said shank at said breakneck groove after said collar is set on said pin at a tensile force greater than said selected force and with said collar being threadably removable from said pin by means of a wrench adapted to engage said ridges and grooves.

2. The fastener of claim 1 with said head being formed with a plurality of axially extending ridges and grooves adapted to be gripped by a wrench.

3. The fastener of claim 1 with approximately twelve of said ridges and grooves being formed.

References Cited by the Examiner

UNITED STATES PATENTS

| | | | |
|---|---|---|---|
| 2,064,342 | 12/1936 | England | 10—153 |
| 2,278,962 | 4/1942 | Young | 10—152 |
| 2,318,326 | 5/1943 | Padley et al. | 29—505 |
| 2,396,661 | 3/1946 | Keller et al. | 85—37 |
| 2,542,376 | 2/1951 | Torresen | 29—505 |
| 2,873,641 | 2/1959 | Evans | 151—22 |
| 2,972,274 | 2/1961 | La Bombard | 85—5 |

FOREIGN PATENTS

| | | |
|---|---|---|
| 22,402 | 8/1957 | East Germany. |
| 828,180 | 2/1960 | Great Britain. |

CARL W. TOMLIN, *Primary Examiner.*

R. S. BRITTS, *Assistant Examiner.*